M. GREENEBAUM.
Steam Heater.
No. 33,483.
2 Sheets—Sheet 1.
Patented Oct. 15, 1861.
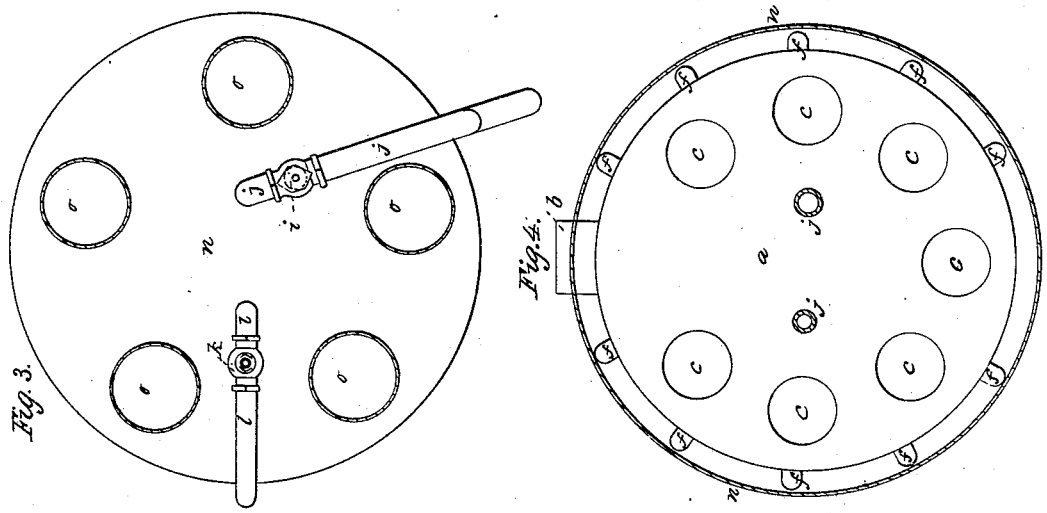
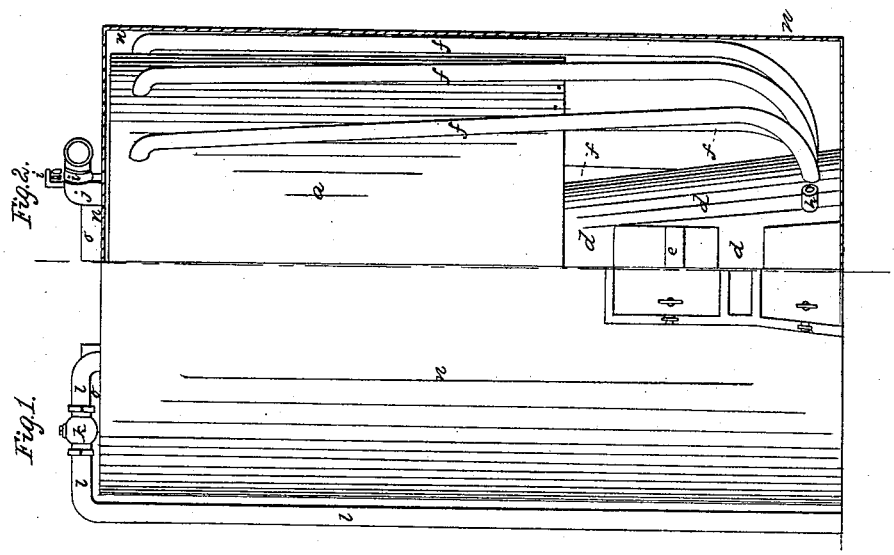
Witnesses:
Inventor:

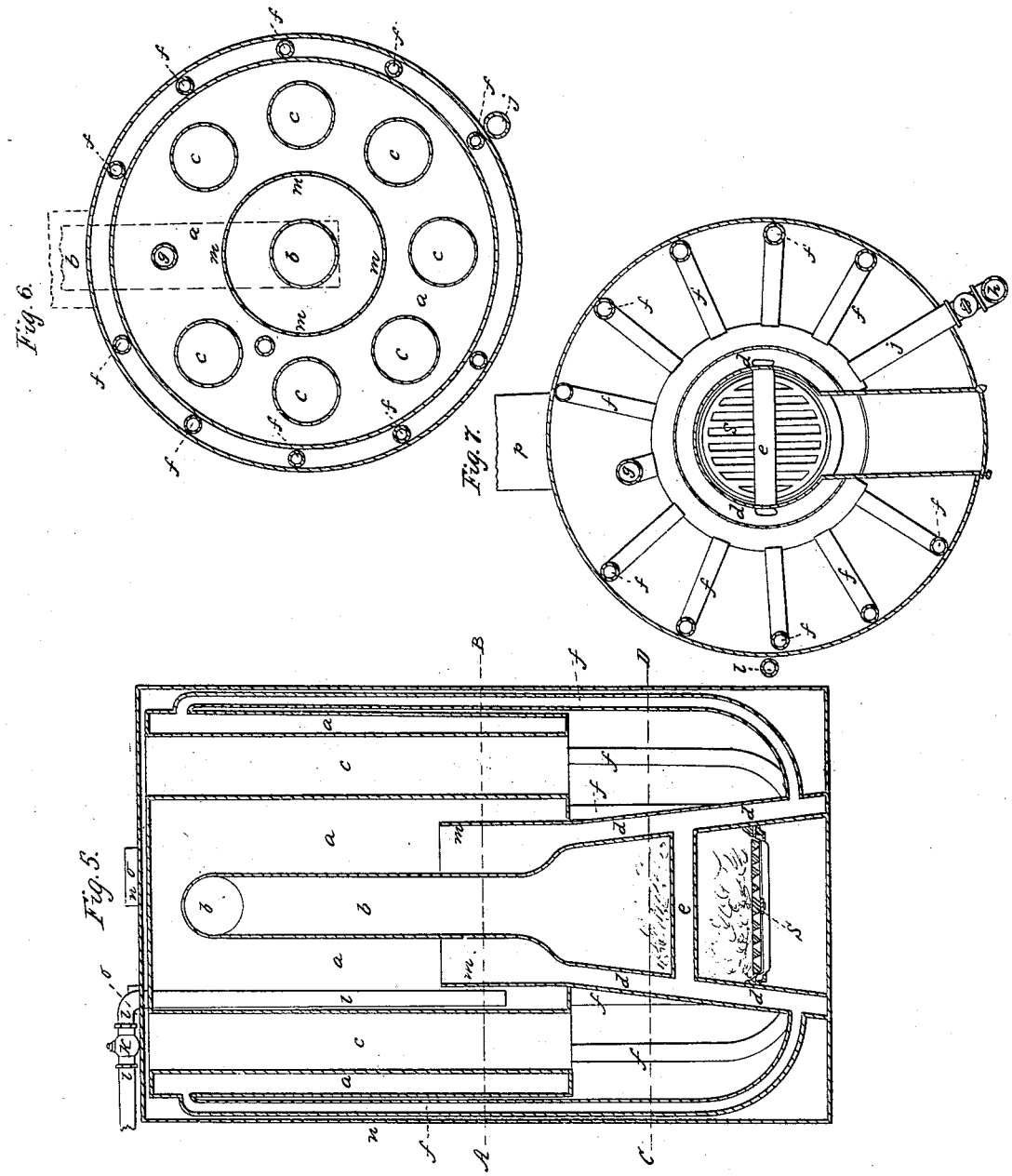

UNITED STATES PATENT OFFICE.

MICHAEL GREENEBAUM, OF CHICAGO, ILLINOIS.

IMPROVEMENT IN HEATING APPARATUS.

Specification forming part of Letters Patent No. 33,483, dated October 15, 1861.

*To all whom it may concern:*

Be it known that I, MICHAEL GREENEBAUM, of the city of Chicago, in the county of Cook and State of Illinois, have invented a new and Improved Mode of Constructing Hot-Water Air-Heating Furnaces for the Purpose of Warming Buildings, of which the following is a specification.

The nature of my invention consists in arranging and combining a number of cylinders around a fire-pot, so that, such cylinders being filled with water and heated by placing fire in the pot or fire-chamber, a circulation is given to the water upward through the cylinders and downward through a number of pipes connecting the top and bottom of the cylinders. I then inclose the apparatus with a casing, forming an air-chamber, and admit cold air into this chamber, which is rarefied and heated by radiation from the surfaces of the cylinders and pipes containing the hot water. The heated air is conducted from the top of the air-chamber in pipes in usual manner.

To enable others skilled in the art to make and use my invention, I will proceed to describe its construction and operation, reference being had to the accompanying drawings, and to the letters of reference thereon, where—

Figure 1 represents a front elevation of one-half the casing; and Fig. 2, an elevation with the casing removed, showing the interior of the air-chamber and the arrangement of the pipes and cylinders. Fig. 3 is a top view of the hot-air chamber. Fig. 4 is a top view of the apparatus with top of air-chamber removed. Fig. 5 is a vertical section. Fig. 6 is a horizontal section on the line A B, and Fig. 7 is a similar section on the line C D.

Like parts are lettered alike in each figure of the drawings.

The grate-bars $s$ of the fire-pot are shown on Figs. 5 and 7, the fire-place surrounded by the conical cylindric water-box $d\ d$. The outer lining of this water-box extends upward into the principal cylinder $a\ a$, as shown at $m\ m$. The inner lining of the water-box is contracted to form smoke-flue, and is carried up in the center of cylinder $a$, and, turning near the top, passes out through the side of cylinder to the chimney. This flue is shown at $b$.

$e$ represents a water back or pipe placed directly over the fire and communicating with the water-box $d\ d$.

$a\ a$, &c., represent the principal cylinder or water-reservoir.

$c\ c\ c$, &c., represent flues passing vertically through the cylinder $a\ a$, and secured by proper flanges to the top and bottom of the cylinder.

$f f f$ represent metallic pipes, the upper ends attached to and opening into the cylinder $a\ a$ and the lower end attached to and opening into the water-box $d\ d$ below the fire-place.

$l\ l$ represent the induction water-pipe to supply the apparatus with water. This pipe descends into cylinder $a\ a$ near the bottom of the same, and is fitted with a valve at $k$, which admits the water to flow into the cylinder, but prevents an outward flow of the water.

The casing inclosing the apparatus and forming the hot-air chamber is shown at $n\ n$.

The cold-air duct to supply the air-chamber is shown at $p$ on Fig. 7.

$g$ represents a pipe connected to and opening through the bottom of cylinder $a$. The other end of pipe $g$ is connected to and opens into the water-box $d\ d$.

$h$ represents a sediment-pipe and blow-off cock. This pipe is connected to and opens into water-box $d\ d$ near the bottom of the same.

$j\ j$ represent an escape-pipe fitted with a safety-valve at $i$. This pipe is attached to and opens into cylinder $a$ through the top of the same. I sometimes conduct the hot water through this pipe $j\ j$ to a tank or reservoir, where hot water may be desired for any purpose.

The hot-air pipes from the top of the air-chamber are shown at $o\ o$ on Figs. 1, 2, and 5.

The operation of this heater is such that, water being admitted through the induction-pipe $l\ l$, the cylinder $a\ a$ and water-box $d\ d$ and pipes $f f$ and $g$ are entirely filled; also, the water-back $e$, communicating with box $d\ d$, is filled. Then by placing fire on the grate-bars the water is rapidly heated in the box $d\ d$ and water-back $e$. The hot water rises into cylinder $a\ a$, and the cold water passes down the pipes $f f$ to the bottom of the water-box $d\ d$, where it in turn becomes heated and ascends, thus keeping up a circulation of water upward through the cylinder $a\ a$ and downward through the pipes $ff$; also, the pipe $g$ passes the cold water from the bottom of the cylinder $a\,a$ to the bottom of water-box $d\,d$. Therefore the cylinder $a\,a$, water-box $d\,d$, pipes $f\,f$, and flues $c\,c$ present great radiating-surface to the air in the hot-air chamber. The air, becoming heated, passes up through the flues $c\,c$, and around the cylinder $a\,a$ is conducted away from the heater by the pipes $o\,o$.

What I claim as my invention, and desire to secure by Letters Patent, is—

1. The arrangement relatively to the stack $b$ and fire-grate $s$ (of a heater, $n$) of the cylinder $d\,d\,m$, cylinder $a$, flues $c\,c$, and circulation-pipes $f\,f$, the whole operating conjunctively, substantially in the manner and for the purpose described.

2. The combination of the devices $l$, $g$, $h$, and $j$ with a heater, $n$, constructed substantially as described, and combining the cylinders $d$ and $a$, flues $c\,c$, and circulation-pipes $f\,f$, as described, for the purpose set forth.

3. The combination and arrangement of the grate $s$, stack $b$, transverse pipe $e$, and cylinders $d\,a$, flues $c\,c$, circulation-pipes $f\,f$, and devices $l$, $g$, $h$, and $j$, in the manner and for the purposes herein described.

MICHAEL GREENEBAUM.

Witnesses:
T. J. KINSELLA,
R. PRINDIVILLE.